Feb. 24, 1948.  H. D. WILSON  2,436,465
UNDER-WATER BATTERY VENT PLUG
Filed July 9, 1945
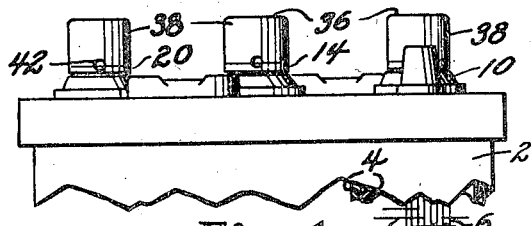
Fig. 1
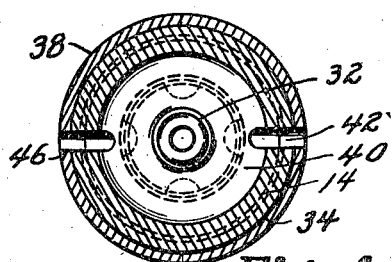
Fig. 4
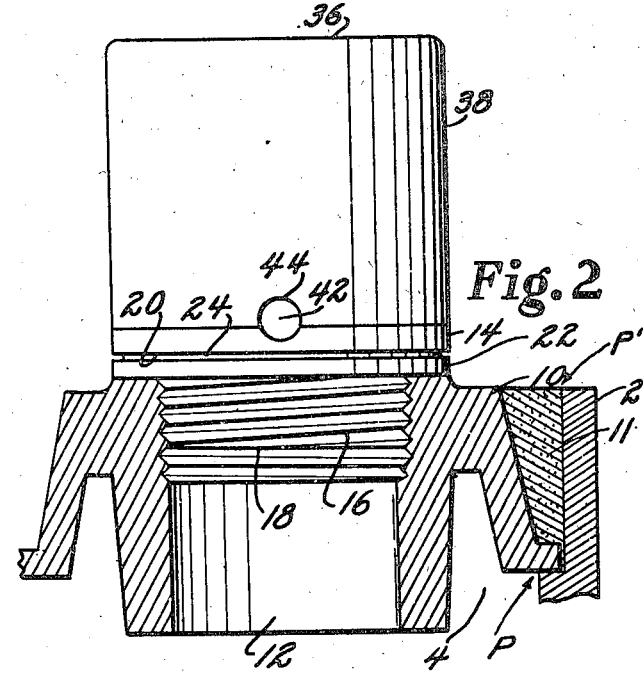
Fig. 2
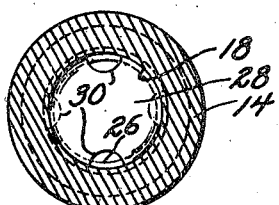
Fig. 5
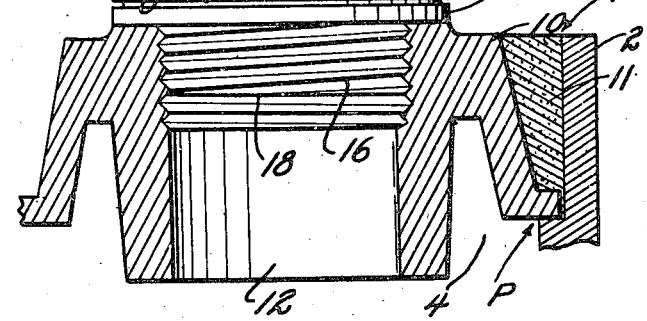
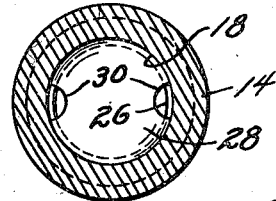
Fig. 6
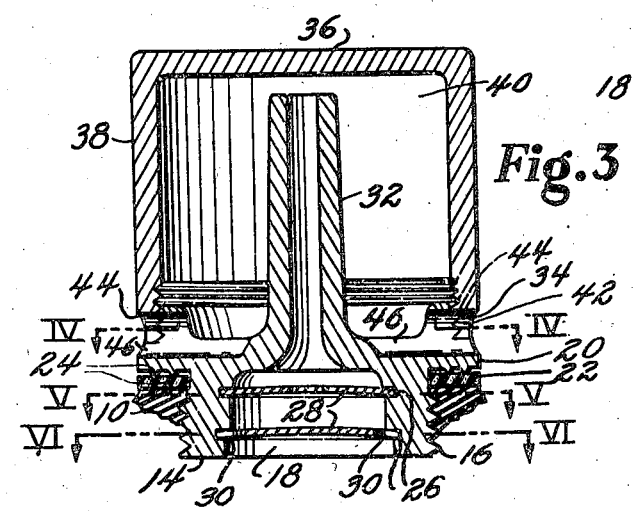
Fig. 3
Fig. 7
INVENTOR.
HARLAND D. WILSON
BY
ATTORNEYS Patented Feb. 24, 1948

2,436,465

UNITED STATES PATENT OFFICE 2,436,465

UNDERWATER BATTERY VENT PLUG

Harland D. Wilson, Toledo, Ohio

Application July 9, 1945, Serial No. 603,831

13 Claims. (Cl. 136—177)

1

This invention relates to batteries, more particularly of the lead-acid type.

The current war, which has brought a demand for motor-driven amphibious vehicles and land vehicles capable of being driven through streams as well as from landing vessels through sea water, has created many new problems. The electric energy-supplying components such as batteries, in addition to extremely rough jolting, frequently become submerged and this invention serves as a protection for the battery as well as the personnel of the vehicle under such conditions. It is not unusual for the battery to be submerged as much as six feet in sea water. This invention has satisfactorily performed under conditions even in excess of demands encountered under the most extreme conditions.

A principal object of this invention is to provide a vent plug for an electric storage battery permitting free gas escape from the battery cells even though submerged and, at the same time, prevent any seepage of the submerging fluid thereinto, thus rendering the full efficiency of the battery available and prevent any damage thereto as a result of being submerged.

Another object of this invention is to permit free venting of gases from battery cells without undue back pressure even when the vehicle, of which it may be a component, is submerged to the maximum depth at which the vehicle itself may be operable.

Still another object of this invention is to prevent any of the liquid in which the battery may be submerged from entering the cells. This is of particular value should the battery be submerged in sea water.

Another object of the invention is to prevent any spill of electrolyte through the vent even when the battery is subjected to severe jolting.

Still another object of the invention is to provide a vent for a battery cell subject to immersion which is self-draining, that is, should any of the liquid get into the upper portion or dome of the vent device, it will quickly drain therefrom when the cell is removed from the liquid. Likewise, any electrolyte splashed upwardly into the lower portion of the device will drain back into the cell.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings:

Fig. 1 is a side elevation of the upper portion of an electric storage battery of the lead-acid type, including under-water vents embodying the invention herein;

Fig. 2 is an enlarged view of one of the plugs as positioned in a battery cell cover;

Fig. 3 is a longitudinal section through a vent plug embodying the invention herein;

Fig. 4 is a view on the line IV—IV (Fig. 3), looking in the direction of the arrow;

Fig. 5 is a view on the line V—V (Fig. 3), looking in the direction of the arrow;

Fig. 6 is a view on the line VI—VI (Fig. 3), looking in the direction of the arrow; and Fig. 7 is a bottom plan view of one of the plugs.

Battery 2, such as of the lead-acid type, has cells 4 containing the usual plate pack 6 and electrolyte 8. A closure plate or cell-cover 10 which hermetically seals each cell preferably by means of a suitable sealing compound 11 located in the channel formed between the side of the cover 10 and the inner surface of the walls of the container at the top thereof. The cover 10 is provided with an aperture 12 normally closed by a vent plug. While vent plugs, as heretofore commonly used, prove satisfactory under normal conditions, they are entirely inadequate when the battery is called upon to function submerged as under conditions heretofore described.

To this end, a plug or base member 14 has threaded connection 16 with the aperture 12 and is provided with cylindrical extension 18 toward the cell interior. This base is provided with rim or seat 20 over-hanging cover 10 around the aperture, and to insure a liquid and gas-tight assembly therebetween, there is provided a compressible gasket 22 which may be placed between the rim and cover surface with circumferential ribs 24 on the underside of the rim cooperating to perfect a seal.

The interior wall of the extension 18 is provided with a plurality of grooves 26, herein shown as two, forming seats for flexible baffle discs 28 having peripheral notches 30. These baffles are each provided with a pair of the notches 30 diametrically spaced. The diameter of the baffles, as originally produced, is the same or greater than the diameter of the bottom of the grooves 26. Therefore, in assembly, the baffles are snapped into seated position and consequently are held flexed in an upwardly concaved position. Furthermore, the alternate discs or baffles are assembled, so that the notches 30 are positioned approximately 90 degrees from each other.

By this construction any acid which might be splashed upwardly into the extension 18 and passing through the openings 30 would be prevented from reaching the upper portions of the plug not only due to the baffles themselves but to the sinuous passage formed by the notch arrangement. Furthermore, any acid which might escape as far as the outer side of a baffle away from the cell will be drained back into the cell due to the concaved nature of the baffles. In communication with the extension 18, and extending in the opposite direction therefrom, is an elongated, outwardly tapered, tubular extension 32 conducting any gases from the cell a substantial distance above the base 14. The upper portion of the base 14 is provided with a threaded boss 34, with which dome member 36 has depending threaded skirt 38 connected thereto, the dome providing a chamber or air lock 40 around the extension 32 and in which the extension 32 terminates near the upper or outer portion of the chamber. When the dome is firmly seated on the base, ducts or ports 42 may be drilled through the lower portion of the skirt 38 and the rim 20 resulting in registering grooves 44 in the skirt and grooves 46 across the seat 20. When the battery is submerged, the air lock provided by the chamber 40 permits only a limited quantity of liquid to enter the dome 36 in proportion to the pressure exerted by the submerging liquid as determined by the depth of submersion, yet the gases from the extensions 32 may escape through the ducts 42 to the atmosphere.

Since there is some flow of liquid into the chamber 40, the downwardly and outwardly tapered construction of the extension 32, together with the ducts 42 being spaced as close to the cover as the stock in the plug will permit, provide for quick drainage of the liquid once the vent plug is clear of the submerging liquid.

In operation, as the vent sinks below the surface of the liquid, a quantity of the liquid enters the dome through the ports 42 and rises thereinto. However, the gas escaping through the extension 32 in turn causes such liquid to be forced outwardly until the pressure of the escaping gas and the pressure of the liquid becomes equalized. The height of the extension 32 employed may be determined by the maximum pressure expected to be exerted by the liquid in which such battery may become submerged and still function. This design also provides an additional valuable advantage. In battery construction, the space between the cover 10 and the container 2 is filled with a comparatively soft sealing composition such as a bituminous thermoplastic 11 and if undue pressure builds up within the battery, such composition may be blown out, thereby creating an opening to the battery interior. On the other hand, if the pressure on the outside becomes too great, there is a chance that some of the sealing composition may be exuded into the battery. By the present arrangement, the pressure P, Figure 2, on the interior of the battery is maintained substantially equal to any pressure P' on the outside of the battery, so that any rupture of the composition 11, due to unequal pressures thereon, is entirely eliminated. By a flow and ebb action between changes of the pressures of the expelled gases and submerging liquid, the pressures on the inside and outside are constantly neutralized.

All of the parts of this vent may preferably be made from moldable materials such as hard rubber, resulting in an efficient and light-weight device. However, in some instances, other materials may be employed even acid-resisting and non-corrosive metals.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation.

What is claimed and it is desired to secure by United States Letters Patent is:

1. In an electric storage battery, a cell having a plate pack and an electrolyte therein, a cover for the cell provided with an aperture, a vent plug cooperating therewith including a base over said aperture and having a tubular extension outwardly therefrom and a dome over said extension, said dome having a port open to the atmosphere spaced remotely from the terminus of said extension adjacent the base of said plug.

2. In an electric storage battery, a cell having a plate pack and an electrolyte therein, a cover for the cell provided with an aperture, a base-providing member in said aperture, a dome on said base over the aperture having a port open to the atmosphere adjacent said base, and a tubular extension from said base within the dome and in communication with the aperture, said extension terminating in the dome beyond the port and outwardly tapered from its terminus toward the port.

3. In an electric storage battery, a cell having a plate pack and an electrolyte therein, a cover for the cell provided with an aperture, a vented plug insertable in said aperture provided with a base having a seat adjacent said aperture, a dome having a skirt coacting with said seat and providing a chamber above the aperture, a tubular extension from said plug into said chamber, and a duct through said seat and skirt from said chamber to the atmosphere exterior of the dome.

4. In an electric storage battery, a cell having a plate pack and an electrolyte therein, a cover for the cell provided with an aperture, a plug insertable in said aperture provided with a rim over-hanging the cover around the aperture, a dome having a skirt coacting with said rim and providing a chamber above the aperture, a tubular extension from said plug into said chamber, and a duct through said rim and skirt from said chamber to the atmosphere exterior of the dome.

5. In an electric storage battery, a cell having a plate pack and an electrolyte therein, a cover for the cell provided with an aperture, a base closing said aperture and having a cylindrical portion extending into the aperture toward the cell interior, a baffle in said cylindrical portion provided with an opening adjacent the periphery thereof, a tubular extension from said base in communication with the cylindrical portion, and a dome over said tubular extension providing a chamber thereabout, the extension terminating adjacent the end of the chamber remote from said aperture, said dome having a port to the atmosphere adjacent the other end of said chamber.

6. The structure of claim 5 wherein the baffle is concaved toward the tubular extension.

7. The structure of claim 5 wherein the opening is provided by a notch in the periphery of the baffle.

8. In an electric storage battery, a cell having a plate pack and an electrolyte therein, a cover for the cell provided with an aperture, a base closing said aperture and having a cylindrical portion extending into the aperture toward the cell interior, a pair of spaced baffles in said cylindrical portion provided with out-of-alignment openings therethrough, a tubular extension from said base in communication with the cylindrical portion, and a dome over said tubular extension providing a chamber thereabout, the extension terminating adjacent the end of the chamber remote from said aperture, said dome having a port to the atmosphere adjacent the other end of said chamber.

9. The structure of claim 8 wherein the baffles are each concaved toward the tubular extension.

10. The structure of claim 8 wherein the baffles provide a sinuous passage from the cell interior to the exterior.

11. In an electric storage battery, a cell having a plate pack and an electrolyte therein, a cover for said cell provided with an aperture therethrough, a plug having threaded connection with said aperture and having a cylindrical portion extending toward the cell interior, a plurality of baffles in spaced relation in said cylindrical portion providing non-aligned by-passes, said plug having a seal-providing rim over-hanging the closure about the aperture and providing an elongated tubular extension away from the aperture in the opposite direction from the cylindrical portion and in communication therewith, a dome for the tubular extension provided with a skirt engaging said seat and providing a chamber around the extension, said extension terminating in the chamber away from said rim, and registering cut-outs in said skirt and rim forming a duct from said chamber to the dome exterior.

12. In an electric storage battery, a cell having a plate pack and an electrolyte therein, a cover for said cell provided with an aperture therethrough, a plastic seal between said cell and cover exposed to pressure from within and without said cell, a plug having threaded connection with said aperture and having a cylindrical portion extending toward the cell interior, a plurality of baffles in spaced relation in said cylindrical portion providing non-aligned by-passes, said plug having a seat-providing rim over-hanging the closure about the aperture and providing an elongated tubular extension away from the aperture in the opposite direction from the cylindrical portion and in communication therewith, a dome for the tubular extension provided with a skirt engaging said seat and providing a chamber around the extension, said extension terminating in the chamber away from said rim, and registering cut-outs in said skirt and rim forming a duct from said chamber to the dome exterior, said plug and dome providing a tortuous passage between the cell interior and exterior by means of which the pressures from within and without the cell acting against said seal are equalized.

13. In an electric storage battery, a cell having a plate pack and an electrolyte therein, a cover for said cell provided with an aperture therethrough, a plastic seal between said cell and cover exposed to pressure from within and without said cell, a plug having threaded connection with said aperture and having a cylindrical portion extending toward the cell interior, a plurality of baffles in spaced relation in said cylindrical portion providing non-aligned by-passes, said plug having a seat-providing rim overhanging the closure about the aperture and providing an elongated tubular extension away from the aperture in the opposite direction from the cylindrical portion and in communication therewith, a compressible gasket between said rim and closure, a dome for the tubular extension provided with a skirt engaging said seat and providing a chamber around the extension, said extension terminating in the chamber away from said rim, and registering cut-outs in said skirt and rim forming a duct from said chamber to the dome exterior, said plug and dome providing the sole passage between the cell interior and exterior by means of which the pressures from within and without the cell acting against said seal are equalized.

HARLAND D. WILSON.

REFERENCES CITED

The following references are of record in the file of this patent:

UNITED STATES PATENTS

| Number | Name | Date |
| --- | --- | --- |
| 1,128,275 | Snyder | Feb. 9, 1915 |
| 1,907,911 | Wallace et al. | May 9, 1933 |
| 1,992,875 | Mobley | Feb. 26, 1935 |

FOREIGN PATENTS

| Number | Country | Date |
| --- | --- | --- |
| 14,937 | Great Britain | 1886 |
| 106,330 | Great Britain | May 21, 1917 |